United States Patent [19]

Simroth

[11] Patent Number: 5,268,418
[45] Date of Patent: Dec. 7, 1993

[54] POLYMER/POLYOL AND PREFORMED STABILIZER SYSTEMS

[75] Inventor: Donald W. Simroth, Charleston, W. Va.

[73] Assignee: Arco Chemical Technology, L.P., Wilmington, Del.

[21] Appl. No.: 977,372

[22] Filed: Nov. 17, 1992

Related U.S. Application Data

[62] Division of Ser. No. 537,187, Jun. 12, 1990, Pat. No. 5,196,476.

[51] Int. Cl.$^5$ .................... C08K 5/05; C08F 220/26; C08F 220/44
[52] U.S. Cl. .................................. 524/765; 524/769; 526/320; 526/342
[58] Field of Search ............................... 524/765, 769

[56] References Cited

U.S. PATENT DOCUMENTS 4,997,857  3/1991  Timberlake et al. ............... 521/116

Primary Examiner—Joseph L. Schofer
Assistant Examiner—Wu C. Cheng
Attorney, Agent, or Firm—David L. Mossman; Dennis M. Kozak

[57] ABSTRACT

Improved polymer/polyol compositions and processes for making them; high potency preformed stabilizers used to make the polymer/polyol compositions and processes for making them; and improved polyurethane products made from the polymer/polyols compositions; characterized by a material reduction in polymer/polyol viscosity while raising the polymer solids content.

42 Claims, No Drawings

POLYMER/POLYOL AND PREFORMED STABILIZER SYSTEMS

This is a division of application Ser. No. 07/537,187, filed Jun. 12, 1990 now U.S. Pat. No. 5,196,476.

BRIEF DESCRIPTION OF THE INVENTION

The present invention relates to: improved polymer/polyol compositions and processes for making them; high potency preformed stabilizers used to make the polymer/polyol compositions and processes for making them; and improved polyurethane products made from the polymer/polyols compositions.

BRIEF BACKGROUND TO THE INVENTION

Seymour, *Polymers for Engineering Applications*, ASM International (1987), Gowariker et al., *Polymer Science*, John Wiley & Sons Inc. (1986) and Barrett (Ed.), *Dispersion Polymerization in Organic Media*, John Wiley & Sons Inc. (1975) are recommended background reading material.

Polymer/polyol compositions suitable for use in producing polyurethane foams, elastomers and the like, and the polyurethanes, are commercial products. The two major types of these polyurethane foams are termed slabstock and molded. Slabstock foams are used in the carpet, furniture and bedding industries. Primary uses of slabstock foam are as carpet underlay and furniture padding. In the molded foam area, high resiliency (HR) molded foam is the foam type generally made. HR molded foams are used in the automotive industry for a breadth of applications ranging from molded seats to energy-absorbing padding and the like.

The basic patents relating to such polymer/polyol compositions are Stamberger Re. U.S. Pat. Nos. 28,715 (reissue of U.S. Pat. No. 3,383,351) and Re. 29,118 (reissue of U.S. Pat. No. 3,304,273). A stable dispersion of polymer particles in a polyol can be produced by polymerizing one or more ethylenically unsaturated monomer dissolved or dispersed in a polyol in the presence of a free radical catalyst. These polymer/polyol compositions produce polyurethane foams and elastomers having higher load-bearing capacities than those produced from unmodified polyols.

Initially, the primary polymer/polyol compositions accepted commercially used acrylonitrile in its manufacture. Many of these compositions possessed undesirably high viscosities for certain applications. More recently, acrylonitrile-styrene monomer mixtures have been used commercially to make the polymer component of polymer/polyols.

The expanding demand for polymer/polyols has highlighted several product needs and this has spawned additional advances in technology. For example, a market demand has evolved for "virtually" scorch-free slabstock foams, i.e., white foam products. Virtually scorch-free foams possessing satisfactory load-bearing and other foam properties, even at ever-decreasing densities (viz.—1.5 pounds per cubic foot or less), are available without substantial economic penalty.

Virtually scorch-free foams are achieved by using relatively high styrene contents (e.g., —about 65 to 70 percent styrene) in the acrylonitrilestyrene monomer mixture. In addition, such high styrene monomer mixtures are used broadly in the molded foam area.

Still, polymer/polyols derived from such high styrene monomer mixtures appear incapable of satisfying ever-increasing market needs, which include rigorous stability requirements and increased load-bearing characteristics. This is particularly prevalent in the slabstock area where many formulations require the use of "neat" polymer/polyols, i.e., polymer/polyol undeluted by conventional polyols. Though neat polymer/polyols are not usually employed in the molded foam area, there is a need for polymer/polyols which can impart higher load-bearing characteristics to such foams.

Polymer/polyols with increased load-bearing characteristics can be obtained by increasing their polymer or solid contents. Solid contents of 30 to 60 weight percent, or higher, are desired. Yet, the art has not been capable of increasing solid contents without reducing the stability of the polymer/polyol and undesirably increasing its viscosity.

Employment of high styrene monomer mixtures and high solid contents' polymer/polyols, by prior practices, generally resulted in undesirably high viscosity polymer/polyols. The viscosity of a polymer/polyol should be sufficiently low for ease of handling during its manufacture. In addition, the viscosity should facilitate transport, handling and, ultimately, adequate processability, in the employed foam processing equipment. Because of increased usage of sophisticated mixing systems, such as impingement systems, excessive viscosity of the polymer/polyol is becoming a significant problem in the molded area. The need for lower viscosity polymer/polyols is apparent to satisfy these increased demands in the art.

As indicated, polymer/polyol stability is a concern to makers of polyurethanes. Once, seediness or filterability, a measure of stability of polymer/polyols, was not a major issue in commercial practices. With advances in the state of the art of polyurethane production, polymer/polyol stability criteria were revised, especially in the molded foam area.

With commercial developments in sophisticated, high-speed and large-volume equipment and systems for handling, mixing and reacting polyurethane-forming ingredients have evolved the need for highly stable and low viscosity polymer/polyols. Polymer/polyols have certain minimum requirements for satisfactory processing in such sophisticated foam equipment. Typically, the prime requirement is that the polymer/polyols possess sufficiently small particles so that filters, pumps and the like do not become plugged or fouled in relatively short periods of time.

Though there have been advances in reduction in viscosity and increase in solids of polymer/polyols, there is a need for improvement in viscosity reduction and increase in solids content. Greater reductions in viscosity are needed to meet market demands and greater effective increases in solids content are also needed by the market. More importantly, there is a need for technology in polymer/polyol that maximizes viscosity reduction while also providing a viable mechanism to higher solids content.

Priest et al., U.S. Pat. No. 4,208,314 describe low viscosity polymer/polyols made from acrylonitrile-styrene monomer mixtures. These polymer/polyols are convertible to low density, water-blown polyurethane foams having reduced scorch, especially with relatively low acrylonitrile-to-styrene ratios. The Priest et al. patent also provides a process for making polymer/polyols with reduced particulates.

Enhanced stability of polymer/polyols is believed to be provided by the presence of a minor amount of a graft or addition copolymer formed in situ from growing polymer chains and polyol molecules. Some prior approaches incorporate small amounts of unsaturation into the polyol in addition to that inherently present in the polyoxyalkylene polyols typically used in forming polymer/polyols. This was done in the belief that improved stability will result due to an increased amount of an addition copolymer stabilizer expected to be formed. U.S. Pat. Nos. 3,652,639, 3,823,201, and 3,850,861, British Patent No. 1,126,025 and Japanese Patent Nos. 52-80919 and 48,101494 utilize this approach. This use of "stabilizer precursors," also termed a "macromer" that contains a particular level of reactive unsaturation, is based on the belief that during polymerization, in the preparation of the polymer/polyol, adequate amounts of stabilizer will be formed by the addition polymerization of the precursor stabilizer with a growing polymer chain.

The general concept of using stabilizer precursors in polymerization is discussed in Barrett (1975), supra. U.S. Pat. Nos. 4,454,255 and 4,458,038 illustrate this technique. The macromer in the '255 and '038 patents may be obtained by reacting a polyol with a compound having reactive ethylenic unsaturation such as, for example, maleic anhydride or fumaric acid. A further example of the use of this technique is U.S. Pat. No. 4,460,715. The reactive unsaturation in the '715 stabilizer is provided by an acrylate or methacrylate moiety.

Van Cleve et al., U.S. Pat. No. 4,242,249 disclose improved polymer/polyols prepared by utilizing certain preformed dispersants or stabilizers. These polymer/polyols provide stability satisfactory for commercial production, and use of one or more of the following: (1) higher amounts of styrene or other comonomer when acrylonitrile copolymer polymer/polyols are being prepared, (2) higher polymer contents or (3) the use of lower molecular weight polyols. The particular dispersant employed and the concentration utilized vary with respect to the monomer system used in preparing the polymer/polyols.

U.S. Pat. No. 4,550,194 prepares a polyol by reacting a conventional polyether polyol with an organic compound having ethylenic unsaturation and an anhydride group forming a half ester and subsequently reacting that product with alkylene oxide in the presence of calcium naphthenate or cobalt naphthenate. Example 51 of the patent uses pentaerythritol.

Simroth et al., U.S. Pat. No. 4,652,589, patented Mar. 24, 1987, describe stabilizer precursors for polymer/polyols. Stabilizer A is made by reacting a 34 hydroxyl number, 15 weight percent ethylene oxide capped polyoxyproxylene triol with maleic anhydride and subsequently with ethylene oxide. The stabilizer precursor has a hydroxyl number of 32, an unsaturation of 0.1 meq/gm, with the unsaturation being 30/70 maleate/fumarate. The retained unsaturation is 50 percent of the unsaturation provided by the maleic anhydride. Stabilizer B is made by reacting a 28 hydroxyl number sorbitol started polyol, containing 10% internal ethylene oxide, with maleic anhydride, and subsequently with propylene oxide. The precursor stabilizer has a hydroxyl number of 28 and an unsaturation of approximately 0.07 meq/g, with the unsaturation being of the fumarate type. The retained unsaturation is 70 percent of the unsaturation provided by the maleic anhydride.

European Patent Application 87114233.7, based on copending U.S. application Ser. No. 913,328, filed Sep. 30, 1986, is directed to stabilizers having four key features: (1) they are prepared from a starting polyol having a functionality greater than 4; (2) they have at least 60% retained unsaturation; (3) they have viscosities greater than 2000 centipoises at 25° C.; and (4) the starting polyol is capped with ethylene oxide and/or the adduct formed between the starting polyol and the a reactive unsaturated compound is capped with ethylene oxide.

Other prior art of interest include Simroth et al., U.S. Pat. Nos. Re. 32,733, patented Aug. 16, 1988, Ramlow et al., 3,931,092, patented Jan. 6, 1976, Ramlow et al., 4,014,846, patented Mar. 29, 1977, Ramlow et al., 4,093,573, patented Jun. 6, 1978, Shah, 4,148,840, patented Apr. 10, 1979, Shook et al., 4,172,825, patented Oct. 30, 1979, Kozawa et al., 4,342,840, patented Aug. 3, 1982, Hoffman et al., 4,390,645, Jun. 28, 1983, Hoffman, 4,394,491, Jul. 19, 1983, Ramlow et al., 4,454,255, patented Jun. 12, 1984, Ramlow et al., 4,458,038, Jul. 3, 1984, and Hoffman, 4,745,153, patented May 17, 1988.

As used herein, the following terms shall have the following meanings:

"monomer"—the simple unpolymerized form of chemical compound having relatively low molecular weight, e.g., acrylonitrile, styrene, methyl methacrylate, and the like.

"free radically polymerizable ethylenically unsaturated monomer"—a monomer containing ethylenic unsaturation (>C=C<) that is capable of undergoing free radically induced addition polymerization reactions.

"stability"—the ability of a material to maintain a stable form such as the ability to stay in solution or in suspension.

"polymer polyol"—Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to, for example, polyurethane foams and elastomers produced therefrom, higher load-bearing properties than are provided by the corresponding unmodified polyols.

"viscosity"—in centistokes (cSt) measured at 25° C. on a Cannon Fenske viscometer.

"organic polyisocyanate"—organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates). Illustrative polyisocyanates are:

| | |
|---|---|
| 2,4'-diisocyanatotoluene | 2,6-diisocyanatotoluene |
| methylene bis(4-cyclohexyl isocyanate) | 1,2-diisocyanatoethane |
| 1,3-diisocyanatopropane | 1,2-diisocyanatopropane |
| 1,4-diisocyanatobutane | 1,5-diisocyanatopentane |
| 1,6-diisocyanatohexane | bis(3-isocyanatopropyl)ether |
| bis(3-isocyanatopropyl) sulfide | 1,7-diisocyanatoheptane |
| 1,5-diisocyanato-2,2-dimethylpentane | 1,6-diisocyanato-3-methoxyhexane |
| 1,8-diisocyanatooctane | 1,5-diisocyanato-2,2,4-trimethypentane |

| -continued | |
|---|---|
| 1,9-diisocyanatononane | 1,10-disocyanatopropyl)ether of 1,4-butylene glycol |
| 1,11-diisocyanatoundecane | 1,12-diisocyanatododecane bis(isocyanatohexyl) sulfide |
| 1,4-diisocyanatobenzene | 2,4-diisocyanatotolylene |
| 2,6-diisocyanatotolylene | 1,3-diisocyanato-o-xylene |
| 1,3-diisocyanato-m-xylene | 1,3-diisocyanato-p-xylene |
| 2,4-diisocyanato-1-chlorobenzene | 2,4-diisocyanato-1-nitrobenzene |
| 2,5-diisocyanato-1-nitrobenzene | 4,4-diphenylmethylene diisocyanate |
| 3,3-diphenyl-methylene diisocyanate and mixtures thereof. | polymethylene poly(phenyleneisocyanates) |

The preferred polyisocyanates are a mixture of 80% 2,4-tolylene diisocyanate and 20% 2,6-tolylene diisocyanate and polymethylene poly (phenyleneisocyanates).

THE INVENTION

This invention is directed to a novel high potency preformed stabilizer composition and to the manufacture of polymer/polyols therewith which possesses a combination of higher polymer content, greater than 30 weight percent and up to about 60 weight percent, lower viscosities, typically less than about 20,000 cSt, preferably less than about 15,000 cSt, most preferably below 10,000 cSt, excellent product stability such that 100% passes through a 150 mesh screen, exceptionally high amounts of the high polymer content polymer/polyol, up to 100% thereof, pass through a 700 mesh screen test, and improved polyurethanes made therewith.

This invention is an improvement in the art of polymer/polyols in that it recognizes certain unpredictable relationships in composition that achieves remarkable reductions in viscosities of polymer/polyols tracking a broad range of solids content. The polymer/polyols are notable by being essentially free of certain high viscosity byproduct components from the manufacture of the polymer phase, that heretofore got dissolved in the polyol phase, and undesirably increases its viscosity at the sacrifice of the solids content of the polymer/polyol.

This invention overcomes the dissadvantages discovered in prior art stabilized polymer/polyols that in their manufacture, stabilizer components of high viscosity are not sufficiently incorporated into the polymer phase. Because they can be solubilized by the polyol phase, they increase its viscosity. This invention further recognizes an important relationship in the manner of the stabilizer's formation and its composition to the ultimate solids content and viscosity of the polymer/polyol.

This invention relates to:

a composition for forming high potency preformed stabilizer.

the novel process for making high potency preformed stabilizer;

the high potency preformed stabilizer;

a novel composition for making an enhanced polymer/polyol composition;

a novel process for making polymer/polyols;

a novel polymer/polyol composition; and unique polyurethanes having high modulus or load-bearing capacity.

A significant advantage of the invention is the ability to consistently make commercially acceptable polymer/polyols having higher polymer contents and lower viscosities with smaller amounts of free radical catalyst in the formulation.

This invention achieves a polymer/polyol composition which possesses a polymer content of about 30 to about 60 weight percent, based on total weight, a viscosity in centistokes less than about 20,000 cSt over the range of said polymer content, product stability such that essentially 100% passes through a 150 mesh screen and significant amounts of the high polymer content polymer/polyol, indeed, up to essentially 100% thereof, pass through a 700 mesh screen. The composition comprises (I) a liquid base polyol having a hydroxyl number of about 10 to about 180 present in the composition in an amount of from about 40 to about 70 weight percent of the composition, (II) a particulate polymer portion dispersed in the liquid base polyol (I) having an average particle size less than about 10 microns and being stable to settling, comprising free radically polymerizable ethylenically unsaturated monomer, such as, (i) acrylonitrile and/or (ii) at least one other ethylenically unsaturated monomer copolymerizable with acrylonitrile, in the presence of (III) the free radical polymerization product of (A) a free radically polymerizable ethylenically unsaturated monomer, such as, acrylonitrile and/or at least one other ethylenically unsaturated comonomer polymerizable with acrylonitrile, and (B) an adduct of a polyhydric alcohol having the average formula $$A(OROX)_{>3}$$

wherein A is a polyvalent organic moiety, the free valence of which is a >3, or has an average value of >3, R is the divalent residue comprising an alkylene oxide moiety and X is one or more of an organic moiety containing reactive unsaturation, copolymerizable with (A), and hydrogen, about one of such X is the organic moiety containing reactive unsaturation and the remaining X's are hydrogen, (C) optionally adducted with an organic polyisocyanate, wherein the amount of (B) or reaction product of (B), unreacted with (A), that is contained in the liquid polyol (I) is less than about 2 weight percent of the weight of the liquid polyol (I).

In a preferred embodiment of the invention in polymer/polyol composition, (B) is an adduct of a polyhydric alcohol having the average formula $$A(OROX)_{\geq 4}$$

wherein A is a polyvalent organic moiety, the free valence of which is $\geq 4$, or has an average value of $\geq 4$, R is the divalent residue comprising an alkylene oxide moiety and X is one or more of an organic moiety containing reactive unsaturation, copolymerizable with (A), preferably a fumaric compound, and hydrogen, about one of such X is the organic moiety containing reactive unsaturation and the remaining X's are hydrogen. In a further preferred embodiment, the weight ratio of the hydroxy-terminated alkylene oxide moieties of (B) comprises 0.2 to 20 weight percent, on average, of the weight of the particles (II).

Another aspect of this invention is a high potency preformed stabilizer for use in making polymer/polyols comprising the free radical polymerization product of (A) a free radically polymerizable ethylenically unsaturated monomer and (B) an adduct of a polyhydric alcohol having the average formula $$A(OROX)_{>3}$$

wherein A is a polyvalent organic moiety, the free valence of which is $>3$, or has an average value of $>3$, R is the divalent residue comprising an alkylene oxide moiety and X is one or more of an organic moiety containing reactive unsaturation, copolymerizable with (A), preferably a fumaric compound, and hydrogen, about one of such X is the organic moiety containing reactive unsaturation and the remaining X's are hydrogen, in which the adduct may be further adducted with an organic polyisocyanate.

A desirable composition, according to this invention, for forming a high potency preformed stabilizer [designated as stabilizer (II) herein] for use in making polymer/polyols contains:

(A) a precursor to the stabilizer [designated as precursor (I) herein] comprising an esterified product of reaction of:
  (i) a hydroxy-terminated alkylene oxide adduct of a polyol of the formula $$A(OH)_{>3}$$

wherein A is a polyvalent organic moiety, the free valence of which is $>3$, or has an average value of $>3$, and preferably is an organic moiety in which the OH bonded thereto comprise about 20 to about 50 weight percent of the combined molecular weight of $A(OH)_{>3}$;
  (ii) a mono or polycarbonyloxy compound comprising the moiety $$-O-\overset{O}{\underset{\|}{C}}-C=C-$$

(iii) optionally adducted with an organic polyisocyanate;
(B) one or more ethylenically unsaturated monomers, at least one of which copolymerizes with the precursor (I) to the stabilizer;
(C) a free radical polymerization initiator; and
(D) a liquid diluent in which (A), (B), and (C) are soluble, but in which the resulting high potency preformed stabilizer is essentially insoluble.

The novel process for making the high potency preformed stabilizer (II) comprises providing (A), (B), (C), and (D), above, in a reaction zone maintained at a temperature sufficient to initiate a free radical reaction, and under sufficient pressure to maintain only liquid phases in the reaction zone, for a period of time sufficient to react essentially all or all of (A); and recovering a heterogenous mixture containing the high potency preformed stabilizer dispersed in the diluent, and unreacted monomer to the extent present.

A novel enhanced polymer/polyol forming composition, according to this invention, comprises:
  (i) high potency preformed stabilizer (II);
  (ii) a free radically polymerizable ethylenically unsaturated monomer; and
  (iii) a polyol having a hydroxyl number of less than about 180; and
  (iv) a free radical polymerization initiator.

A novel process for making the enhanced polymer/polyol compositions of the invention involves:
(1) providing a heterogenous mixture of the high potency preformed stabilizer (II) and, optionally, liquid diluent (D) above, in combination with
  (a) polyol having a hydroxyl number of less than about 180,
  (b) a free radically polymerizable ethylenically unsaturated monomer,
  (c) a free radical polymerization initiator,
(2) in a reaction zone maintained at a temperature sufficient to initiate a free radical reaction, and under sufficient pressure to maintain only liquid phases in the reaction zone, for a period of time sufficient to react at least a major portion of (b) to form a heterogenous mixture containing the enhanced polymer polyol, unreacted monomers and diluent, and stripping the unreacted monomers and diluent from the enhanced polymer/polyol to recover the same.

A preferred embodiment of the invention includes the use of an acyl peroxide of the following formula as the free radical polymerization initiator in the polymer/polyol process:

$$R-\overset{O}{\underset{\|}{C}}-O-O-\overset{O}{\underset{\|}{C}}-R$$

wherein R is an organic moiety free of substituents or heteroatoms, capable of forming free radical ions in the course of free radical polymerization, which adversely affect the physical properties of the resultant enhanced polymer/polyol.

The invention relates to the manufacture of high solids, white polymer/polyols possessing lower viscosities without sacrificing stability. A feature of the invention includes polymer/polyol compositions containing at least 30 weight % polymer, the remainder comprising liquid polyol. This product possesses excellent product stability and requires less free radical catalyst in its manufacture.

The invention is ultimately employable in compositions for the manufacture of a polymer/polyol polyurethane foams, and the resultant polyurethane foam, wherein there is employed a polymer/polyol, a polyurethane catalyst, an organic polyisocyanate, a silicone surfactant, and a blowing agent. The improvement involves the use as the polymer/polyol in making the polyurethane foam, the polymer/polyol composition of this invention, as described herein.

DETAILED DESCRIPTION OF INVENTION

This invention is an improvement on the compositions and processes described in U.S. Pat. No. 4,242,249 and European Patent Application 87114233.7, described above. This invention meets the market needs for polymer/polyol compositions containing more than 30 weight percent polymer, preferably more than about 40 weight percent polymer, more preferably more than about 45 weight percent polymer, most preferably, at least about 50, and as high as 60 weight percent polymer, and even higher, while at the same time possessing lower viscosities, as correlated to the choice of base polyol, than heretofore was believed possible. These polymer/polyol compositions possess exceptional performance stability and employ lower concentrations of free radical catalyst. The unique advantages are most significantly realized with polymer/polyols containing more than 45 weight percent polymer, or more than 50 weight percent polymer, up to about 60 weight percent polymer.

Precursors (I)

Stabilizer precursors (I) are used to make the novel high potency preformed stabilizers (II) of the invention. Stabilizers (II), in turn, are used to make the polymer/polyols of this invention, functioning to assist in imparting a desired stability to the resulting polymer/polyols. Suitable precursors (I) are, in general, prepared by the reaction of the selected reactive unsaturated compound with an alkoxylated polyol adduct.

Precursor (I) comprises an adduct of a polyhydric alcohol having the average formula

A(OROX)$_{>3}$ wherein A is a polyvalent organic moiety, the free valence of which is >3 or has an average value of >3, R is the divalent residue comprising an alkylene oxide moiety and X is one or more of an organic moiety containing reactive unsaturation, copolymerizable with (A), preferably a fumaric compound, and hydrogen, about one of such X is the organic moiety containing reactive unsaturation and the remaining X's are hydrogen, in which the adduct may be further adducted with an organic polyisocyanate,.

In a preferred embodiment, precursor (I) is an adduct of a polyhydric alcohol having the average formula

A(OROX)$_{\geq 4}$ wherein A is a polyvalent organic moiety, the free valence of which is $\geq 4$, or has an average value of $\geq 4$, R is the divalent residue comprising an alkylene oxide moiety and X is one or more of an organic moiety containing reactive unsaturation, copolymerizable with (A), preferably a fumaric compound, and hydrogen, about one of such X is the organic moiety containing reactive unsaturation and the remaining X's are hydrogen.

In more preferred embodiments of the invention, the adduct has the average formula A(OROX)$_{\geq 5}$, most preferably A(OROX)$_{\geq 6}$, where A is a polyvalent organic moiety, the free valence of which is $\geq 5$ or 6, or has an average value of $\geq 5$ or 6, as the case may be, R and X having the meanings set forth above.

The term "reactive unsaturated compound," that forms X above, means any compound having a carbon-to-carbon double bond which is adequately reactive with the particular monomer system being utilized. It is different from the particular monomer system being used. It is capable of adducting with the alkoxylated polyol adduct, either directly or indirectly, via one or more of a variety of mechanisms ranging from esterification, Michaels Addition, free radical addition, isocyanate adducting, Williamson synthesis, and the like. More specifically, compounds containing alpha, beta unsaturation are preferred, e.g., those conjugated carbonyloxy compounds embraced by the formula:

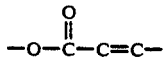

Suitable compounds satisfying this criteria include the maleates, fumarates, acrylates, and methacrylates. While not alpha, beta unsaturated compounds, polyol adducts formed from substituted vinyl benzenes such as chloromethylstyrene may likewise be utilized (adducting with the polyol adduct via a Williamson synthesis, and the like), preferably in combination with a conjugated carbonyloxy compounds. Illustrative examples of suitable alpha, beta unsaturated carbonyloxy compounds which may be employed to form the stabilizer precursor include maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacryl chloride and glycidyl methacrylate.

The reactive unsaturated compound may be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate (see U.S. Pat. No. 4,521,546) or by reaction with unsaturated monoisocyanate, such as 1,1-dimethyl-m-isopropenylbenzylisocyanate.

However, in the practice of this invention, it is preferred that a major molar amount, up to 100 percent, of the alpha, beta carbonyloxy unsaturated compounds used as the reactive unsaturated compound, have fumarate-type unsaturation ("fumarics"), or are unsaturated compounds which, under the reaction conditions used in adducting with the alkoxylated polyol adduct, form a high proportion of fumarate-type unsaturation. Illustrative fumarics are fumaric acid and the fumarates, or one or more of maleic acid, maleic anhydride and maleates which are isomerized to the fumaric structure on or after adduct formation. Preferably, the fumarate structure is provided by the incorporation of maleic anhydride and the isomerization of the ester to fumarate by known treatment with morpholine.

The alkoxylated polyol adduct is desirably a hydroxy-terminated alkylene oxide adduct of "starter" higher hydroxylated alcohols of the formula:

A(OH)$_{>3}$ and preferably a "starter" tetraol and higher hydroxylated alcohols, of the formula:

A(OH)$_{\geq 4}$ wherein A is a polyvalent organic moiety, the free valence of which is >3 or $\geq 4$, or an average value equal thereto, as the case may be.

Illustrative of suitable compounds embraced by the "starter" A(OH)$_{\geq 4}$ alcohol are the following: pentaerythritol, sorbitol, diether of sorbitol, mannitol, diether of mannitol, arabitol, diether or arabitol, sucrose, oligomer of polyvinyl alcohol or glycidol, connected branched chain polyols, mixtures thereof, and the like.

In more preferred embodiments of the invention, the starter alcohol has the average formula A(OH)$_{\geq 5}$, most preferably A(OH)$_{\geq 6}$, where A is a polyvalent organic moiety, the free valence of which is ≧5 or 6, or has an average value of ≧5 or 6, as the case may be.

The starter $A(OH)_{<3}$ or $_{\geq 4}$ or $_{\geq 5}$ or $_{\geq 6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct that is to be reacted with the fumaric component to form precursor (I). The molecular weight of the alkoxylated polyol adduct should be relatively high, preferably above about 4000 (number average) and, more preferably, above about 5000. The minimum molecular weight of the alkoxylated polyol adduct may be about 3000. The preferred 1,2-alkylene oxides are lower 1,2-alkylene oxides, such as ethylene oxide, 1,2-propylene oxide, 1,2-butylene oxide, and the like. In the preferred practice of the invention, the starter $A(OH)_{\geq 4}$ is reacted with 1,2-propylene oxide in an amount sufficiently to create the desired polyol molecular weight. Then, the resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art, and forms no part of this invention. Adduct reactions may be base or acid catalyzed, with base catalyzation preferred.

The alkoxylated polyol adduct is then reacted with a reactive unsaturated compound to introduce the desired degree of unsaturation. In the preferred practice of the invention, the reactive unsaturation is introduced through esterification with the hydroxyl groups of the alkoxylated polyol adduct by reaction with an alpha, beta carbonyloxy unsaturated compound in which the carbonyloxy is part of a carboxylic acid, anhydride or ester group. For example, one mole of a polyol may be reacted with one mole of maleic anhydride to form a half ester of maleic acid. The free carboxylic acid group is typically not further reacted with polyol, but rather, is reacted with 1,2-alkylene oxide such as 1,2-ethylene oxide so as to cap the free carboxyl groups in the esterified product. Thereafter, as an optional feature, the alkoxylated polyol adduct ester may be coupled, not polymerized, with organic polyisocyanate. Such combination of reactions produce the stabilizer precursor (I).

The amount of ethylenic unsaturation in the stabilizer precursor (I) may vary to a significantly extent. The minimum and maximum levels of unsaturation are dictated by the dispersion stability that the precursor (I) imparts through the subsequently formed preformed stabilizer (II), and hence to the polymer/polyol composition.

The minimum amount of unsaturation is that amount which impacts on the dispersion stability of the polymer/polyol. Typically, the lower limit of unsaturation is about 0.5 moles of the reactive unsaturated compound per mole of the alkoxylated polyol adduct ester. The maximum amount of unsaturation is that amount which causes an undesirable amount of cross-linking of the stabilizer precursor (I). When higher amounts of unsaturation are present during preparation of the stabilizer precursor (I), there is a greater probability that species will be formed having more than one double bond per molecule. An undue population of cross-linking could adversely affect the stabilizer's (II) ability to provide dispersion stability enhancement and, as well, cause it to have a significantly increased viscosity. Accordingly, the maximum amount of unsaturation provided should be below that at which significant cross-linking occurs.

The desired amount of reactive unsaturated compound to be used in making precursor (I) will depend on the molecular weight of the alkoxylated polyol adduct. Typically, it will be desirable to employ about 0.5 to about 1.5 moles of the reactive unsaturated compound for each mole of the alkoxylated polyol adduct. Preferably, about 0.7 to about 1.1 moles of the reactive unsaturated compound for each mole of the alkoxylated polyol adduct, are employed to make precursor (I). Less of the reactive unsaturated compound may be used, but if lesser amounts are used, one should contemplate the need for using larger amounts of the thus made precursor (I) in making stabilizer (II). It is preferred to prepare the precursor (I) in such a fashion that the unsaturation is retained to the maximum extent possible.

Loss of unsaturation may occur in stabilizer precursor (I) preparation with any of the alpha, beta unsaturated compounds. For example, it has been recognized that when maleic anhydride is employed anywhere from about 25 percent to essentially all of the unsaturation may be lost. Loss in unsaturation appears to be generally accompanied by an increase in viscosity of precursor (I). Accordingly, it is desirable to utilize an efficient process in the preparation of the precursor such that at least one-quarter (¼) of the added unsaturation is retained.

Precursor (I) preparation is preferably carried out in the presence of a catalytic amount of a strong base. Suitable bases include inorganic bases such as alkali and alkaline earth metal hydroxides and the weak acid salts of alkali and alkaline earth metals, and organic bases such as quaternary ammonium hydroxides, 4-dimethylaminopyridine, 4-pyrrolidinopyridine, and imidazole. Potassium hydroxide has been found to be useful. The amount of catalyst is not critical; and may, for example, be as low as about 10 ppm. or even less when potassium hydroxide is used.

For example, in esterifying the alkoxylated polyol adduct to introduce the fumarate structure, stabilizer precursor (I) having an adequate viscosity may be obtained using about 20 parts per million of potassium hydroxide. This typically allows retention of about 50 percent of the unsaturation, with up to about 70 percent of the unsaturation being of the fumarate type, under reasonably appropriate reaction times and conditions. Viscosities of about 3000 cSt are typically provided.

Suitable reaction temperatures may vary from about 100 to about 125° C. up to about 180° C., or higher. Desirably, the reaction should be carried out in a reactor capable of agitation and subsequent pressurization. Alkylene oxide, preferably ethylene or propylene oxide, either with the other reactants or subsequently, may be added to the reactor to the extent it may be necessary to reduce the acid number of the alkoxylated polyol adduct. The acid number of the alkoxylated polyol adduct should preferably be below about 3.0, most preferably below about 1.0, but not so low as to cause a viscosity increase with accompanying loss of unsaturation. The product may then be cooled and stripped to remove excess alkylene oxide. It is then ready for use in preparing the preformed stabilizer (II). If the fumaric structure is provided by the use of maleic anhydride or acid or ester, then the esterification product is treated with morpholine to convert the maleate units in the precursor structure to fumarate units in the desired concentration.

In the usual case, the maximum viscosity of useful precursor (I) will be dictated by practical considerations, such as: the viscosity of precursor (I) should not be so high that it cannot be conveniently handled. Viscosities up to about 10,000 cSt to about 15,000 cSt may be satisfactorily handled but it is preferred that the viscosity be less than about 8,000 cSt.

Accordingly, precursor (I) may be made by reacting a sorbitol-initiated polyol with maleic anhydride in the presence of potassium hydroxide catalyst. This may be accomplished by using a temperature of about 125° C. to preserve a high proportion of the charged (i.e. added) unsaturation. The maleate unsaturation may then be isomerized to fumarate using morpholine at some lower temperature, such as 80° C. Alternatively, higher temperatures (e.g. about 175° to about 180° C. or so) may be utilized to achieve relatively high levels of fumarate-type unsaturation directly. The techniques involved are well known and may be used as desired.

Viscosity adjustment can be effected by reacting the fumarate ester product with an organic isocyanate such as an organic polyisocyanate at moderate temperatures, e.g., about 60° to about 80° C. In such cases, the amount of reaction is intended to acheive a relative minor amount of viscosity increase, therefore small amounts of the isocyanate are employed.

High Potency Preformed Stabilizers (II)

The high potency preformed stabilizer for use in making polymer/polyols comprising the free radical polymerization product of (A) a free radically polymerizable ethylenically unsaturated monomer and (B) an adduct of a polyhydric alcohol having the average formula

$$A(OROX)_{>3}$$

wherein A is a polyvalent organic moiety, the free valence of which is >3, or has an average value equal thereto, R is the divalent residue comprising an alkylene oxide moiety and X is one or more of an organic moiety containing reactive unsaturation, copolymerizable with (A), preferably a fumaric compound, and hydrogen, about one of such X is the organic moiety containing reactive unsaturation and the remaining X's are hydrogen, in which the adduct may be further adducted with an organic polyisocyanate.

The high potency preformed stabilizer (II) of the invention is derived from the following composition, comprising:
(A) precursor (I);
(B) a free radically polymerizable ethylenically unsaturated monomer, preferably acrylonitrile and at least one other ethylenically unsaturated comonomer co-polymerizable therewith,
(C) a free radical polymerization initiator; and
(D) a liquid diluent in which (A), (B), and (C) are soluble, but in which the resulting high potency preformed stabilizer (II) is essentially insoluble.

In another embodiment, the invention relates to a novel process for making the high potency preformed stabilizer (II) which comprises providing (A), (B), (C), and (D), above, in a reaction zone maintained at a temperature sufficient to initiate a free radical reaction, and under sufficient pressure to maintain only liquid phases in the reaction zone, for a period of time sufficient to react essentially all or all of (A); and recovering a heterogenous mixture containing the high potency preformed stabilizer (II) dispersed in the diluent.

Item (B) above, may be the aforementioned reactive unsaturated compounds, particularly those that are free radically polymerizable. Preferably, (B) is acrylonitrile and at least one other ethylenically unsaturated comonomer copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like.

It is preferred to utilize acrylonitrile with a comonomer and to maintain a minimum of about 5 to 15 percent by weight acrylonitrile in the system. Styrene will generally be preferred as the comonomer, but methyl methacrylate or other monomers may be employed in place of part or all of the styrene. The preferred monomer mixture (B) used to make the stabilizer (II) composition comprises mixtures of acrylonitrile and styrene. The weight proportion of acrylonitrile can range from about 20 to 80 weight percent of the comonomer mixture, more typically from about 30 to about 40 weight percent, and styrene can accordingly vary from about 80 to about 20 weight percent of the mixture. An acrylonitrile to styrene ratio in the monomer mixture of from about 25:75 to 45:55 is particularly preferred, even more particularly about 30:70 to 40:60.

The free radical polymerization initiator useful with respect to item (C) encompasses any free radical catalyst suitable for grafting of an ethylenically unsaturated polymer to a polyol. Useful catalysts include catalysts having a satisfactory half-life within the temperature ranges used in forming the stabilizer (II), i.e.-the half-life should be about 25 percent of less of the residence time in the reactor at a given temperature. Representative examples of useful catalyst species include t-butyl peroxy-2-ethylhexanoate, t-butylperpivalate, t-amyl peroctoate, 2,5-dimethyl-hexane-2,5-di-per-2-ethyl hexoate, t-butylperneodecanoate, and t-butylperbenzoate. Useful also are the azo catalysts such as azobis-isobutyronitrile, 2,2'-azo bis-(2-methylbutyronitrile), and mixtures thereof. The preferred free radical catalysts are peroxides such as tertiary butyl peroctoate.

The catalyst concentration in the formulation is not critical and can be varied within wide limits. As a representative range, the concentration can vary from about 0.01 to about 2.0 weight percent or even more, preferably about 0.05 to about 0.10 weight percent, based upon the total feed to the reactor. Up to a certain point, increases in the catalyst concentration result in increased monomer conversion and grafting; but further increases do not substantially increase conversion. Catalyst concentrations which are too high can cause cross-linking in the preformed stabilizer (II). The particular catalyst concentration selected will usually be an optimum value considering all factors, including costs.

The liquid diluent (D) in which (A), (B), and (C) are soluble, but in which the resulting high potency preformed stabilizer (II) is essentially insoluble, comprises either a single diluent or a mixture of diluents. Such diluents can be mono-ols (monohydroxy alcohols), polyols, hydrocarbons, ethers, and the like liquids. As long as the diluent does not adversely affect the performance of the preformed stabilizer (II), it is suitable for use in the practice of the invention. Preferred are the mono-ols because of their ease of stripping from the final polymer/polyol composition. Mixtures of mono-ol and polyol may be used as diluents. In that case, the polyol need not be stripped off. The choice of mono-ol is not narrowly critical. It should not form two phases at reaction conditions and should be readily stripped from the final polymer/polyol The selection of mono-ol is typically an alcohol containing at least one carbon atoms, such as methanol, ethanol, n-propanol, i-propanol, n-butanol, sec.-butanol, t-butanol, n-pentanol, 2-pentanol, 3-pentanol, and the like, and mixtures of the same. The preferred mono-ol is isopropanol. The concentration of polyol in the diluent composition (D) if used, is limited to an amount below which gelling occurs in preformed stabilizer (II).

The polyol component of diluent (D) is typically the alkylene oxide adduct of A(OH)$_{\geq 4}$ describe above. Though the polyol used in diluent (D) can encompass the variety of polyols described above, including the broader class of polyols described in U.S. Pat. No. 4,242,249, patented Dec. 30, 1980, at column 7, line 39 through column 9, line 10, which disclosure is incorporated herein by reference, it is preferred that the polyol component of diluent (D) be the same as or equivalent to the polyol used in the formation of precursor (I).

If a mixture of a mono-ol and a polyol is used as diluent (D) it is desirable that the polyol comprise the minor amount by weight of diluent (D) and the mono-ol the major amount. In the usual case, the polyol will comprise less than about 30 weight percent of the weight of diluent (D). Preferably, the polyol comprises less than about 20 weight percent of diluent (D), most preferably less than about 15 weight percent. In any case, the polyol portion will be below that concentration at which gelling occurs in preparing the preformed stabilizer (II).

Because of the number of components, the variability of their concentration in the feed, and the variability of the operating conditions of temperature, pressure, and residence or reaction times, a substantial choice of them are possible and still achieve the benefits of the invention. Therefore, it is prudent to test particular combinations to confirm the most suitable operating mode for producing a particular final polymer/polyol product.

In general, the amount of the components in the formulation, on a weight percent of the total formulation for forming stabilizer (II), is as follows:

| Component of Formulation | Amount, weight % |
| --- | --- |
| A | about 10 to 40 |
| B | about 10 to 30 |
| C | about 0.01 to 2 |
| D | about 30 to 80 |

The process for producing the high potency preformed stabilizer (II) is similar to the process for making the polymer/polyol. The temperature range is not critical and may vary from about 80° C. to about 150° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.-a stirred flask or stirred autoclave). The reactors of this type keep the reaction mixture relatively homogeneous and so prevent localized high monomer to precursor (I) ratios such as occur in tubular reactors, where all of the monomer is added at the beginning of the reactor.

The preformed stabilizer (II) of the present invention comprise dispersions in the diluent and any unsaturated monomer in which the preformed stabilizer (II) is probably present as individual molecules or as groups of molecules in "micelles," or on the surface of small polymer particles.

The combination of conditions selected should not lead to cross-linking or gel formation in the preformed stabilizer (II) which can adversely affect the ultimate performance in making the polymer/polyol composition. Combinations of too low a diluent concentration, too high a precursor (I) and/or monomer concentration, too high a catalyst concentration, too long of a reaction time, and too much unsaturation in precursor (I) can result in ineffective preformed stabilizer (II) from cross-linking or gelling.

Novel Polymer/Polyols (III)

As pointed out above, the invention relates to the manufacture of high solids, white polymer/polyols possessing lower viscosities without sacrificing stability. The invention relates to polymer/polyol compositions containing at least 30 weight % polymer, the remainder comprising liquid polyol. This product possesses excellent product stability and uses less free radical catalyst in its manufacture.

This invention achieves a polymer/polyol composition which possesses a polymer content of about 30, preferably about 40, more preferably about 45, and most preferably about 50, to about 60 weight percent. Over the range of solids content, it can have a viscosity in centistokes less than about 20,000 cSt, such that the lower solids containing polymer/polyols can have a viscosity in the range of about 2,000 to about 5,000 (solids of about 30–45 weight %). Significantly, these polymer/polyols exhibit unique product stability such that essentially 100% passes through a 150 mesh screen and significant amounts of the high polymer content polymer/polyol, up to essentially 100% thereof, pass through a 700 mesh screen. As shown in the examples, polymer/polyols having a solids content of 50%, with a viscosity of about 5,900, passed essentially 100% through a 700 mesh screen, and a polymer/polyols having a solids content of 55.3%, with a viscosity of about 10,107, passed essentially 40% through a 700 mesh screen. A truly remarkable illustration of the invention is shown in example 8 where a polymer/polyol containing 59.9 weight % polymer had a viscosity of 13,176 and 19% passed through a 700 mesh screen. In table IV, infra, example 199 taken from U.S. Pat. No. 4,242,249, by comparison, dramatizes the advantages of the invention.

The composition comprises (I) a liquid base polyol having a hydroxyl number of about 10 to about 180 present in the composition in an amount of from about 40 to about 70 weight percent of the composition, (II) a particulate polymer portion dispersed in the liquid base polyol (I) having an average particle size less than about 10 microns and being stable to settling, comprising a free radically polymerizable ethylenically unsaturated monomer, such as, (i) free radical polymerized acrylonitrile and (ii) at least one other ethylenically unsaturated comonomer copolymerizable with acrylonitrile, in the presence of (III) the free radical polymerization product of (A) a free radically polymerizable ethylenically unsaturated monomer, such as, acrylonitrile and at least one other ethylenically unsaturated comonomer copolymerizable with acrylonitrile, and (B) an adduct of a polyhydric alcohol having the average formula $$A(OROX)_{>3}$$

wherein A is a polyvalent organic moiety, the free valence of which is >3, or has an average value of >3, R is the divalent residue comprising an alkylene oxide moiety and X is one or more of an organic moiety containing reactive unsaturation copolymerizable with (A), and hydrogen, about one of such X is the organic moiety containing reactive unsaturation and the remaining X's are hydrogen, (C) optionally adducted with an organic polyisocyanate, wherein the amount of (B) or reaction product of (B), unreacted with (A), that is contained in the liquid polyol (I) is less than about 2 weight percent of the weight of the liquid polyol (I).

In a preferred embodiment of the invention in polymer/polyol composition, (B) is an adduct of a polyhydric alcohol having the average formula $$A(OROX)_{\geq 4}$$

wherein A is a polyvalent organic moiety, the free valence of which is $\geq 4$, or has an average value of $\geq 4$, R is the divalent residue comprising an alkylene oxide moiety and X is one or more of an organic moiety containing reactive unsaturation copolymerizable with (A), preferably a fumaric compound, and hydrogen, about one of such X is the organic moiety containing reactive unsaturation and the remaining X's are hydrogen. In a further preferred embodiment, the weight ratio of the hydroxy-terminated alkylene oxide moieties of (B) comprises 0.2 to 20 weight percent, on average, of the weight of the particles (II).

The novel enhanced polymer/polyol (III) forming composition of this invention comprises:
(i) the high potency preformed stabilizer (II);
(ii) a free radically polymerizable ethylenically unsaturated monomer, such as, acrylonitrile and at least one other ethylenically unsaturated comonomer copolymerizable therewith;
(iii) a polyol having a hydroxyl number of less than about 180;
(iv) a free radical polymerization initiator; and
(v) optionally, diluent (D) characterized above.

The process for making these novel enhanced polymer/polyol (III) compositions comprises:
(1) providing a heterogenous mixture of the high potency preformed stabilizer (II) and, optionally, the diluent (D) in combination with
  (a) a polyol having a hydroxyl number of less than about 180,
  (b) a free radically polymerizable ethylenically unsaturated monomer, such as, acrylonitrile and at least one other ethylenically unsaturated comonomer copolymerizable therewith, and
  (c) a free radical polymerization initiator,
in a reaction zone maintained at a temperature sufficient to initiate a free radical reaction, and under sufficient pressure to maintain only liquid phases in the reaction zone, for a period of time sufficient to react a high proportion of (b) to form a dispersion containing the enhanced polymer polyol (III) and unreacted monomers and diluent, and stripping the unreacted monomers and diluent from the enhanced polymer/polyol (III) to recover the same.

The process of the invention is notable for, over time, not being subject to fluctuations in polymer particle average size and polymer/polyol product viscosity. This is an advantage over processes which directly feed the precursor (I) to reaction with the polyol in directly forming the polymer/polyol.

In a preferred process, the free radical polymerization initiator is an azo compound or an acyl peroxide of the formula:

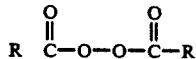

wherein R is an organic moiety free of substituents or heteroatoms capable of forming free radical ions in the course of free radical polymerization which adversely affect the physical properties of the resultant enhanced polymer/polyol. Of the azo initiators, azo-bis-(isobutyronitrile), 2,2'-azo bis-(2-methylbutyronitrile), and mixtures thereof, are preferred. Preferred acyl peroxides are the diacyl peroxides in which the acyl moieties are alkanoyl containing about 8 to about 14 carbon atoms, preferably from about 9 to about 13 carbon atoms. Particularly preferred diacyl peroxides are didecanoyl peroxide and dilauroyl peroxide.

The polyols having a hydroxyl number of less than about 180 comprises poly(oxypropylene) glycols, triols and higher functionality polyols. Such polyols include poly(oxypropylene-oxyethylene) polyols: however, desirably, the oxyethylene content should comprise less than about 50 percent of the total and, preferably, less than about 20 percent. The ethylene oxide can be incorporated in any fashion along the polymer chain. Stated another way, the ethylene oxide can be either incorporated in internal blocks, as terminal blocks, or may be randomly distributed along the polymer chain. As is well known in the art, the preferred polyols herein do contain varying amounts of unsaturation. The extent of unsaturation typically involved does not affect in any adverse way the formation of the polymer/polyols in accordance with the present invention.

For the purposes of this invention, useful polyols should have a number average molecular weight of about 600 or greater, the number average being used herein being the theoretical, hydroxyl number derived value. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 10 and lower, to about 180, preferably, to about 150, more preferably, to about 100, most preferably, to about 75. The hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/m.w.$$

where
OH = hydroxyl number of the polyol
f = functionality, i.e., average number of hydroxyl groups per molecule of polyol
m.w. = molecular weight of the polyol.

The exact polyol employed depends upon the end use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 10 to about 70 for flexible foams. Such limits are not intended to be restrictive, but are merely illustrative of the large number of possible combinations of the above polyol coreactants.

While not preferred, any other type of known polyol may also be used. Among the polyols which can be employed are one or more polyols from the following classes of compositions, known to those skilled in the polyurethane art:
(a) Alkylene oxide adducts of non-reducing sugars and sugar derivatives;
(b) Alkylene oxide adducts of phosphorus and polyphosphorus acids;
(c) Alkylene oxide adducts of polyphenols;
(d) The polyols from natural oils such as castor oil, and the like;
(e) Alkylene oxide adducts of polyhydroxyalkanes other than those already described herein.

Illustrative alkylene oxide adducts of polyhydroxyalkanes include, among others, the alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the 1,2-alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyol is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novalac resins; condensation products of various phenolic compounds and acrolein; the simplest members of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

It should be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

The monomer for making the polymer component may be is an ethylenically unsaturated monomer, preferably acrylonitrile alone or acrylonitrile and at least one other ethylenically unsaturated comonomer copolymerizable with acrylonitrile. Illustrative comonomers are styrene and its derivatives, acrylates, methacrylates such as methyl methacrylate, vinylidene chloride, and the like.

It is preferred to utilize acrylonitrile mixtures with a comonomer, typically with a minimum of about 5 to 15 percent by weight acrylonitrile in the system. Styrene will generally be preferred as the comonomer, but methyl methacrylate, vinylidene chloride, or other monomers may be employed in place of part or all of the styrene. Overall, in terms of the final polymer/polyol composition, to provide polymer/polyols for use in applications where minimal scorch is desired, the acrylonitrile content of the monomer mixture used should be less than about 40 percent by weight, preferably less than about 35 percent.

The free radical polymerization initiator useful in making the polymer/polyol encompasses any free radical catalyst suitable for polymerizing the monomers to the polymer. Useful catalysts include catalysts having a satisfactory half-life within the temperature ranges used in forming the stabilizer (II), i.e.-the half-life should be about 25 percent or less of the residence time in the reactor at a given temperature. Representative examples of useful catalyst species include acyl peroxides such as didecanoyl peroxide and dilauroyl peroxide, alkyl peroxides such as t-butyl peroxy-2-ethylhexanoate, t-butylperpivalate, t-amyl peroctoate, 2,5-dimethylhexane-2,5-di-per-2-ethyl hexoate, t-butylperneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methoxylbutyronitrile), and mixtures thereof. Most preferred are the acyl peroxides of the above formula and the azo catalysts.

The catalyst concentration employed is not critical and can be varied considerably. As a representative range, the concentration can vary from about 0.1 to about 5.0 weight percent or even more, based upon the total feed to the reactor. Up to a certain point, increases in the catalyst concentration result in increased monomer conversion; but further increases do not substantially increase conversion. The particular catalyst concentration selected will usually be an optimum value considering all factors, including costs. It has been determined that lower concentrations can be used in conjunction with the high potency preformed stabilizer (II) and still achieve stable polymer/polyols.

Particularly preferred in the practice of the invention, are the use of azo catalysts and the aforementioned acyl peroxides of the above formula. Such acyl peroxides have the unique advantage of effecting the desired degree of polymerization essentially without raising the viscosity of the polymer/polyol over that obtained with the azo catalyst. This enhances ones ability to achieve higher solids polymer/polyols with good product stability without raising product viscosity. Such acyl peroxides can be used in molar amounts substantially less than the amounts required when using other free radical catalysts in forming the polymer/polyols.

The polymer/polyols are preferably produced by utilizing a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 140° C. or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.-a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer/polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer/polyols are highly useful, particularly where the end use application requires as little scorch as possible.

In the preferred embodiment, all of the product (viz. 100%) will pass through the filter employed in the 150 mesh filtration hinderance (filterability) test that will be described in conjunction with the Examples. This insures that the polymer/polyol products can be successfully processed in all types of the relatively sophisticated machine systems now in use for large volume production of polyurethane products, including those employing impingement-type mixing which necessitate the use of filters that cannot tolerate any significant amount of relatively large particles. In addition, a significant amount of the polymer/polyol passes the 700 mesh filtration hindrance test, as characterized more fully in the examples. It should be appreciated that the 700 mesh filtration hindrance test presents the most rigorous test of polymer/polyol stability.

| As used in the Examples, the following designations, symbols, terms and abbreviations have the following meanings: | |
| --- | --- |
| Polyol A | A polyol made by reacting propylene oxide and ethylene oxide with sorbitol in the presence of potassium hydroxide catalyst and refining to remove catalyst. The polyol contains about 8 weight percent ethylene oxide as a cap and has a hydroxyl number of about 28. |
| Polyol B | A polyol made by reacting propylene oxide and ethylene oxide with sorbitol in the presence of potassium hydroxide catalyst and refining to remove catalyst. The polyol contains about 8 weight percent ethylene oxide as an internal block and has a hydroxyl number of about 28. |
| Polyol C | A polyol made by reacting propylene oxide and ethylene oxide with glycerol in the presence of potassium hydroxide catalyst and refining to remove catalyst. The polyol contains about 10 weight percent internal ethylene oxide and has a hydroxyl number of about 52. |
| Polyol D | A polyol made by reacting propylene oxide and ethylene oxide successively with glycerol in the presence of potassium hydroxide catalyst and refining to remove catalyst. The polyol contains about 19 weight percent ethylene oxide as a cap and has hydroxyl number of about 35. |
| Azo catalyst | Azo-bis(isobutyronitrile) |
| Catalyst A | A polyurethane foam amine catalyst sold as "NIAX Catalyst A-1" by Union Carbide Corporation. |
| Catalyst B | A polyurethane tin catalyst sold as "T-9". |
| Surfactant A | A silicone surfactant sold for use in foam by Union Carbide Corporation as "Silicone Surfactant L-6202". |
| Isocyanate A | Modified liquid form of 4,4'-diphenylmethane diisocyanate (MDI) having an equivalent weight of 143 sold as "Isonate 143L" by the Dow Chemical Company. |
| TDI | A mixture of 80 weight percent, 2,4-diisocyanatotoluene and 20 weight percent 2,6-diisocyanatotoluene. |
| Density | Density in pounds per cubic foot (ASTM D-3574, Test A). |
| Porosity | Porosity in CFM (ASTM D-3574, Test G). |
| IFD 25% | Indentation Force Deflection 25% (ASTM D-3574, Test B1 and Test B2). |
| IFD 65% | Indentation Force Deflection, 65% (ASTM D-3574, Test B1 and Test B2). |
| IFD 65/25 | Indentation Force Deflection, 65% divided by Indentation Force Deflection, 25% (ASTM D-3574, Test B1 and Test B2). |
| Tensile | Tensile in psi (ASTM D-3574, Test E). |
| Elongation | Elongation in percent (ASTM D-3574, Test E). |
| Tear | Tear Resistance in pounds per inch (ASTM D-3574, Test F) |
| Viscosity | Viscosities were measured by Cannon Fenske viscometer (cSt). |
| Filtration Hindrance (Filterability) | Filterability is determined by diluting one part by weight sample (e.g., 200 grams) of polymer/polyol with two parts by weight anhydrous isopropanol (e.g., 400 grams) to remove any viscosity-imposed limitations and using a fixed quantity of material in relation to a fixed cross-sectional area of screen (e.g., 1⅛ in. diameter), such that all of the polymer/polyol and isopropanol solution passes by gravity through a 150-mesh or 700-mesh screen. The 150-mesh screen has a square mesh with average mesh opening of 105 microns, and it is a "Standard Tyler" 150 square-mesh screen. The 700-mesh screen is made with a Dutch twill weave. The actual screen used had a nominal opening of 30 microns. The amount of sample which passes through the screen within 1200 |

-continued

As used in the Examples, the following designations, symbols, terms and abbreviations have the following meanings:

seconds is reported in percent, a value of 100 percent indicates that over 99 weight percent passes through the screen.

Preparations

A. Preparation of Precursor (I)

The following general procedure was followed for Example 1. The polyol was charged to a stirred reactor purged with nitrogen. The mixture was heated at 80° C. followed by the addition of the maleic anhydride solid and 50° C. aqueous KOH. The content were then heated to the desired temperature and ethylene oxide was added by pumping. After the reaction was completed, the excess oxide was removed by stripping under vacuum. The results are summarized in Table I below. The acid number reported was the final acid number (in mg KOH per gram of sample) after the product was stripped.

B. Coupling of Precursor (I)

The following general procedure was used in Example 2 for the reaction of Isocyanate A with the macromonomer formed in Example 1. The sample from Example 1 was placed in a stirred reactor and heated to 80° C. The indicated amount of Isocyanate A was added slowly. The mixture was maintained at 80° C. for one hour after the addition was complete. The results of these experiments are summarized in Table II.

C. Preparation of High Potency Preformed Stabilizer (II)

The preformed dispersion stabilizers were prepared in a continuous polymerization system employing a tank reactor fitted with baffles and an impeller. The feed components were pumped into the reactor continuously after going through an inline mixer to assure complete mixing of the feed components before entering the reactor. The contents of the reactor were well mixed. The internal temperature of the reactor was controlled to within 1° C. The product then flowed out the top of the second reactor continuously through a back pressure regulator that had been adjusted to maintain at least 65 psig pressure on both reactors. The preformed dispersion stabilizer then flowed through a cooler into a collection container. About 25 ppm of tertiary butyl catechol was added to the product container to prevent any polymerization during storage or transfer.

D. Enhanced Polymer Polyols Preparations

A continuous polymerizations system was used, employing a tank reactor fitted with baffles and an impeller. The feed components were pumped into the reactor continuously after going through an inline mixer to assure complete mixing of the feed components before entering the reactor. The internal temperature of the reactor was controlled to within 1° C. The contents of the reactor were well mixed. The product flowed out the top of the reactor and into a second unagitated reactor also controlled within 1° C. The product then flowed out the top of the second reactor continuously through a back pressure regulator that had been adjusted to give about 45 psig pressure on both reactors. The crude product then flowed through a cooler into a collection vessel. Percent by weight polymer in the polymer polyol was determined from analysis of the amount of unreacted monomers present in the crude product. The crude product was vacuum stripped to remove volatiles before testing. All of the polymer polyols in the Examples were stable compositions.

E. Free-rise Foam Preparations

Examples 11 through 17 are free-rise foams prepared from the polymer/polyols as identified in the examples by the following procedure using the proportion of components shown in Table V, infra. The polymer/polyol, amine catalyst, and silicone surfactant were charged to a one-half gallon paper container equipped with a baffle assembly, and mixed at 2400 rpm for 60 seconds with a dual turbine stirrer placed about one inch above the bottom of the container. The mixture was allowed to set for 15 seconds to degas. The tin catalyst was added after degassing and mixed at 2400 rpm's for 10 seconds. With the mixer still running, tolylene diisocyanate isomeric mixture was added, and the components were mixed for 5 seconds. The mixture was poured after is started to cream into a 14×14×6 inch cardboard cake box. The foam mixture was allowed to react and subsequently to rise freely in the box until the reaction was complete. The foam was then placed in a conventional oven preheated to 225° C. for 5 minutes. Foam properties were determined pursuant to ASTM Standard D-3574-77. All of the foams were prepared using TDI at an index of 115.

EXAMPLE 1

This Example illustrates the preparation of a precursor (I) with fumerate type unsaturation. The process used was the same as has been previously set forth and the parameters are set forth in Table 1 below.

TABLE I

| Example Number | 1 |
|---|---|
| Polyol | A |
| Maleic Anhydride Weight % | 1.07 |
| meq/g | 0.11 |
| KOH ppm | 60 |
| Moles Ethylene Oxide per mole maleic anhydride | 1.5 |
| Reaction Temp., °C. | 110 |
| Reaction Time (hours) | 27 |
| Acid No. | 0.39 |
| Isomerized with morpholine | Yes |
| Unsaturation, mequiv./g-polyol | 0.090 (measured as fumarate) |
| Viscosity | 2452 |
| Retained Unsaturation (%) | 82 |

EXAMPLE 2

This Example illustrates the coupling of a precursor (I) with an organic diisocyanate to a higher viscosity.

The process used was the same as has been previously set forth and the parameters are set forth in Table II below.

TABLE II

| Wt % Isocyanate A | Viscosity cSt at 25° C. |
|---|---|
| 0.64 | 6310 |

EXAMPLE 3

This Example illustrates the preparation of a stabilizer (II) as previously described. The specific parameters are set forth in Table III below.

TABLE III

Stabilizer (II) Preparation

| Feed Composition: | |
|---|---|
| Diluent Type | Isopropanol/Polyol B |
| Diluent Concentration, Wt. % in Total Feed | 60%/3.99% |
| Precursor (I) Type | From Ex. 2 |
| Precursor Concentration, Wt. % in Total Feed | 19.95% |
| Monomers (30/70 A/S) | 15.96% |

TABLE III-continued

Stabilizer (II) Preparation

| Cat. conc. wt. %* | 0.10% |
|---|---|
| Reaction Conditions: | |
| Temperature, °C. | 120 |
| Pressure, psig | 65 |
| Residence Time in each stage, min. | 40 |

*Solution of 50% tertiary butyl peroctoate in dioctyl phthalate.

EXAMPLES 4-10

The following examples show that polymer polyols made by this invention at polymer contents of about 45 percent and higher have both acceptable filtration hindrance and viscosity as compared to the prior art Example 199 of U.S. Pat. No. 4,242,249 ("'249").

TABLE IV

| | Polymer Polyol Examples | | | | | | | |
|---|---|---|---|---|---|---|---|---|
| Example No. | 4 | 5 | 6 | 7 | 8 | 9 | 10 | 199 ('249) |
| Polyol Type | C | C | C | C | C | D | C | V of '249 |
| Preparation Conditions: | | | | | | | | |
| Reaction Temperature, °C. | 115 | 115 | 115 | 116 | 114 | 115 | 115 | 125 |
| AZO conc., wt. % in total feed | 0.5 | 0.5 | 0.5 | 0.5 | 0.5 | 0.45 | (1) | 1.3 |
| Stabilizer (II), wt % in total feed | 5.2 | 5.2 | 5.9 | 5.9 | 7.2 | 5.1 | 5.1 | 4.4 |
| Stabilizer (II) of Example | 3 | 3 | 3 | 3 | 3 | 3 | 3 | |
| Isopropanol, wt. % in total feed | 4.0 | 3.1 | 3.5 | 3.5 | 4.3 | 5.0 | 4.0 | |
| Monomer, wt. % in total feed | 43.2 | 43.7 | 48.1 | 53.0 | 57.1 | 42.8 | 43.2 | 47.1 |
| Ratio of Acrylonitrile to Styrene, wt. % | 30/70 | 30/70 | 30/70 | 30/70 | 30/70 | 40/60 | 30/70 | 40/60 |
| Residual Acrylonitrile, wt. % | 0.4 | 0.4 | 0.5 | 0.4 | 0.8 | 1.2 | 0.6 | 1.03 |
| Residual Styrene, m wt. % | 0.8 | 1.0 | 0.9 | 0.9 | 1.5 | 0.4 | 1.2 | 0.95 |
| Total Polymer in Product, by calc. wt. % | 45.2 | 45.1 | 50.2 | 55.3 | 59.9 | 45.0 | 44.9 | 45.2 |
| Product Properties: | | | | | | | | |
| Viscosity | 3792 | 4214 | 5923 | 10107 | 13176 | 6716 | 3937 | 35,500 |
| Filtration Hindrance: | | | | | | | | |
| % thru 150 mesh screen | 100 | 100 | 100 | 100 | 100 | 100 | 100 | 5.8 |
| ppm on 150 mesh screen | 14 | 6 | 9 | 9 | 20 | 7 | 12 | 2374 |
| % thru 700 mesh screen | 100 | 100 | 100 | 40 | 19 | 100 | 100 | 0.335 |

(1) 0.70 weight % didecanoyl peroxide.

EXAMPLES 11-17

These examples (see Table V) show the higher loads, as indicated by the IFD numbers, that result from the higher polymer contents without any significant loss in tensile properties.

TABLE V

| Example Number | 11 | 12 | 13 | 14 | 15 | 16 | 17 |
|---|---|---|---|---|---|---|---|
| POLYMER POLYOL | | | | | | | |
| Polymer Polyol from | Ex. 4 | Ex. 4 | Ex. 5 | Ex. 6 | Ex. 6 | Ex. 7 | Ex. 8 |
| FOAM FORMULATIONS (parts per hundred parts polyol) | | | | | | | |
| Polymer Polyol of Ex. | 100 | 100 | 100 | 100 | 100 | 100 | 100 |
| Water | 2.3 | 2.3 | 2.3 | 2.3 | 2.3 | 2.3 | 2.3 |
| Catalyst A | 0.03 | 0.03 | 0.03 | 0.03 | 0.03 | 0.03 | 0.03 |
| Catalyst B | 0.11 | 0.11 | 0.11 | 0.11 | 0.11 | 0.11 | 0.11 |
| Surfactant A | 0.70 | 0.70 | 0.70 | 0.70 | 0.70 | 0.70 | 0.70 |
| FOAM DATA Properties | | | | | | | |
| Density | 2.34 | 2.33 | 2.43 | 2.36 | 2.34 | 2.37 | 2.38 |
| Porosity | 34.7 | 34.7 | 40.1 | 32.0 | 37.4 | 15.8 | 21.2 |
| IFD, 25% | 144.5 | 140 | 153.9 | 165 | 160.3 | 212.9 | 219.9 |
| 65% | 309.3 | 301 | 336.8 | 378.8 | 364.8 | 542.3 | 572.3 |
| 65/25 | 2.14 | 2.15 | 2.19 | 2.30 | 2.28 | 2.55 | 2.60 |
| Tensile | 34.3 | 32.0 | 32.7 | 36.3 | 35.1 | 29.9 | 37.2 |
| Elongation | 113.4 | 115.8 | 94.7 | 96.2 | 93.2 | 47.7 | 55.4 |
| Tear | 2.07 | 2.34 | 2.10 | 2.39 | 2.63 | 2.0 | 2.04 |

Previously available polymer polyols having polymer contents of about 40 percent can be converted into foam using the above formulation which have load-bearing capacities of about 120 lbs. as measured by their 25% IFD values. By contrast, the above examples demonstrate foams prepared from polymer/polyols of this invention have significantly higher load-bearing capacities. The patent literature does not appear to disclose foams having 25% IFD values above 125 lbs. (see for example, U.S. Pat. Nos. 4,454,255; 4,458,038; and 4,689,354)

I claim:

1. A composition for forming a high potency preformed stabilizer for use in making polymer/polyols which contains:
   (A) a precursor to the stabilizer comprising an esterified product of reaction of:
      (i) a hydroxy-terminated alkylene oxide adduct of a polyol of the formula $A(OH)_{>3}$ wherein A is a polyvalent organic moiety, the free valence of which is $>3$;
      (ii) a mono or polycarbonyloxy compound comprising the moiety

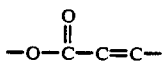

(iii) optionally adducted with an organic polyisocyanate;
   (B) one or more ethylenically unsaturated monomers, at least one of which copolymerizes with the precursor (A) to the stabilizer;
   (C) a free radical polymerization initiator; and
   (D) a liquid diluent in which (A), (B), and (C) are soluble, but in which the resulting high potency preformed stabilizer is essentially insoluble.

2. The composition for forming a high potency preformed stabilizer of claim 1 wherein
   (A) the precursor to the stabilizer comprises an esterified product of reaction of:
      (i) a hydroxy-terminated alkylene oxide adduct of a polyol of the formula $A(OH)_{\geq 4}$ wherein A is a polyvalent organic moiety, the free valence of which is $\geq 4$.

3. A process for making a high potency preformed stabilizer which comprises providing (A), (B), (C), and (D) of claim 2 in a reaction zone maintained at a temperature sufficient to initiate a free radical reaction, and under sufficient pressure to maintain only liquid phases in the reaction zone, for a period of time sufficient to react essentially all or all of (A); and recovering a heterogenous mixture containing the high potency preformed stabilizer dispersed in the diluent, and unreacted monomer to the extent present.

4. The high potency preformed stabilizer made by the process of claim 3.

5. The composition for forming a high potency preformed stabilizer of claim 1 wherein $A(OH)_{\geq 4}$ is one or more alcohols from the group comprising pentaerythritol, sorbitol, mannitol, arabitol, sucrose, oligomer of polyvinyl alcohol, polyvinyl glycidol, and connected branched chain polyols.

6. The composition for forming a high potency preformed stabilizer of claim 5 wherein the alkylene oxide of the hydroxy-terminated alkylene oxide adduct of a polyol comprises the reaction product of a lower alkylene oxide and $A(OH)_{\geq 4}$.

7. The composition for forming a high potency preformed stabilizer of claim 6 wherein the alkylene oxide is propylene oxide and ethylene oxide.

8. The composition for forming a high potency preformed stabilizer of claim 6 wherein the alkylene oxide is propylene oxide.

9. The composition for forming a high potency preformed stabilizer of claim 6 wherein the alkylene oxide is propylene oxide.

10. The composition for forming a high potency preformed stabilizer of claim 6 wherein the alkylene oxide is ethylene oxide.

11. The composition for forming a high potency preformed stabilizer of claim 6 wherein $A(OH)_{\geq 4}$ is sorbitol.

12. The composition for forming a high potency preformed stabilizer of claim 6 wherein the mono or polycarbonyloxy compound is a fumaric or is convertible into a fumaric.

13. The composition for forming a high potency preformed stabilizer of claim 7 wherein the mono or polycarbonyloxy compound is a fumaric or is convertible into a fumaric.

14. The composition for forming a high potency preformed stabilizer of claim 8 wherein the mono or polycarbonyloxy compound is a fumaric or is convertible into a fumaric.

15. The composition for forming a high potency preformed stabilizer of claim 9 wherein the mono or polycarbonyloxy compound is a fumaric or is convertible into a fumaric.

16. The composition for forming a high potency preformed stabilizer of claim 10 wherein the mono or polycarbonyloxy compound is a fumaric or is convertible into a fumaric.

17. The composition for forming a high potency preformed stabilizer of claim 11 wherein the mono or polycarbonyloxy compound is a fumaric or is convertible into a fumaric.

18. The composition for forming a high potency preformed stabilizer of claim 12 wherein the mono or polycarbonyloxy compound is a fumaric or is convertible into a fumaric.

19. The composition of claim 1 wherein the liquid diluent (D) in which (A), (B), and (C) are soluble, but in which the resulting high potency preformed stabilizer is essentially insoluble, comprises either a single diluent or a mixture of diluents.

20. The composition of claim 19 wherein the diluent (D) is one or more of mono-ols, polyols, hydrocarbons, and ethers.

21. The composition of claim 20 wherein the diluent (D) is a mono-ol.

22. The composition of claim 20 wherein the diluent (D) is a mixture of mono-ol and polyol.

23. The composition of claim 21 wherein the mono-ol is a $C_{1-5}$ monohydric alcohol.

24. The composition of claim 23 wherein the mono-ol is one or more of methanol, ethanol, n-propanol, i-propanol, n-butanol, sec.-butanol, t-butanol, n-pentanol, 2-pentanol, 3-pentanol, and mixtures thereof.

25. The composition of claim 24 wherein the mono-ol is isopropanol.

26. The composition of claim 22 wherein the polyol is the alkylene oxide adduct of $A(OH)_{\geq 4}$.

27. The composition of claim 26 wherein the polyol comprise the minor amount by weight of diluent (D) and the mono-ol the major amount.

28. The composition of claim 27 wherein the polyol comprises less than about 30 weight percent of the weight of diluent (D).

29. The composition of claim 28 wherein the polyol comprises less than about 20 weight percent of diluent (D).

30. The composition of claim 29 wherein the polyol comprises less than about 15 weight percent of diluent (D).

31. The process of claim 3 wherein the liquid diluent (D) in which (A), (B), and (C) are soluble, but in which the resulting high potency preformed stabilizer is essentially insoluble, comprises either a single diluent or a mixture of diluents.

32. The process of claim 31 wherein the diluent (D) is one or more of mono-ols, polyols, hydrocarbons, and ethers.

33. The process of claim 32 wherein the diluent (D) is a mono-ol.

34. The process of claim 32 wherein the diluent (D) is a mixture of mono-ol and polyol.

35. The process of claim 33 wherein the mono-ol is a $C_{1-5}$ monohydric alcohol.

36. The process of claim 35 wherein the mono-ol is one or more of methanol, ethanol, n-propanol, i-propanol, n-butanol, sec.-butanol, t-butanol, n-pentanol, 2-pentanol, 3-pentanol, and mixtures thereof.

37. The process of claim 36 wherein the mono-ol is isopropanol.

38. The process of claim 34 wherein the polyol is the alkylene oxide adduct of $A(OH)_{\geq 4}$.

39. The process of claim 38 wherein the polyol comprise the minor amount by weight of diluent (D) and the mono-ol the major amount.

40. The process of claim 39 wherein the polyol comprises less than about 30 weight percent of the weight of diluent (D).

41. The process of claim 40 wherein the polyol comprises less than about 20 weight percent of diluent (D).

42. The process of claim 41 wherein the polyol comprises less than about 15 weight percent of diluent (D).

* * * * *